United States Patent

Weir

[15] 3,685,939
[45] Aug. 22, 1972

[54] MOLD SEPARATING APPARATUS

[72] Inventor: Thomas A. Weir, 5809 29th Ave. N., Minneapolis, Minn. 55422

[22] Filed: July 29, 1970

[21] Appl. No.: 59,193

[52] U.S. Cl. ............... 425/214, 425/338, 425/351, 425/444
[51] Int. Cl. ................... B30b 7/02, B30b 15/14
[58] Field of Search.......... 18/16 E, 16 F, 16 H, 16 R, 18/16 P, 17 P, 17 J, 2 RM, 30 LV

[56] References Cited

UNITED STATES PATENTS

| 1,971,850 | 8/1934 | Ernst | 18/16 P |
|---|---|---|---|
| 2,331,015 | 10/1943 | Dawes et al. | 18/16 P |
| 2,059,387 | 11/1936 | Nanfeldt | 18/17 P |
| 2,420,813 | 5/1947 | Camerota | 18/16 P |
| 2,494,162 | 1/1950 | Camerota | 18/16 P |
| 3,518,724 | 7/1970 | Book | 18/16 P |
| 2,883,704 | 4/1959 | Jurgeleit | 18/17 J |
| 2,938,232 | 5/1960 | Martin | 18/17 J X |
| 3,508,299 | 4/1970 | Ahern | 18/30 LV |
| 1,800,849 | 4/1931 | Stacy | 18/16 H |
| 3,050,778 | 8/1962 | Jurgeleit | 18/17 P |
| 3,129,462 | 4/1964 | Borah | 18/16 P |

*Primary Examiner*—J. Howard Flint, Jr.
*Attorney*—Dugger, Peterson, Johnson and Westman

[57] ABSTRACT

The main ram of a press advances a bottom mold plate toward a fixedly located top mold plate. During the advancing stroke, a third or floating plate is engaged by the bottom mold plate and urges it upwardly into juxtaposition with the top plate. Attached so as to be movable in unison with the third or floating plate (or with any additional such plates when employed) are a number of shuttle bars having stops at one end thereof that are shifted so as to be engaged by the supporting frame for the bottom plate during the return stroke of the ram. In this way, the third plate is forcibly separated from the top plate during the retraction of the bottom plate. A frictional drag is imposed on the shuttle bars, there being a brake device for each shuttle bar.

2 Claims, 8 Drawing Figures

INVENTOR.
THOMAS A. WEIR

INVENTOR.
THOMAS A. WEIR

INVENTOR.
THOMAS A. WEIR

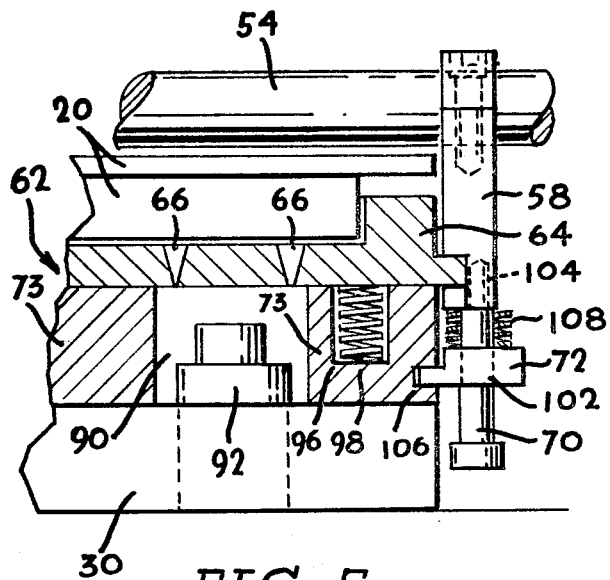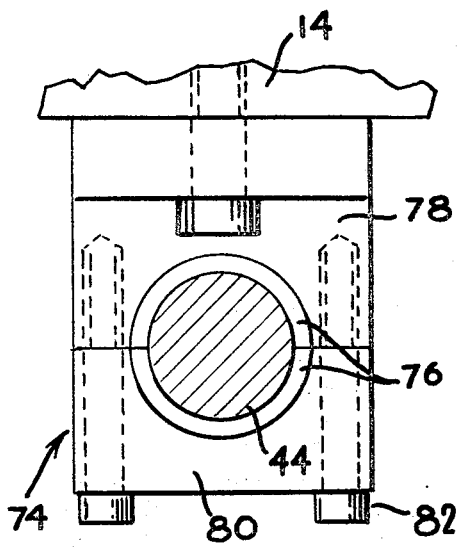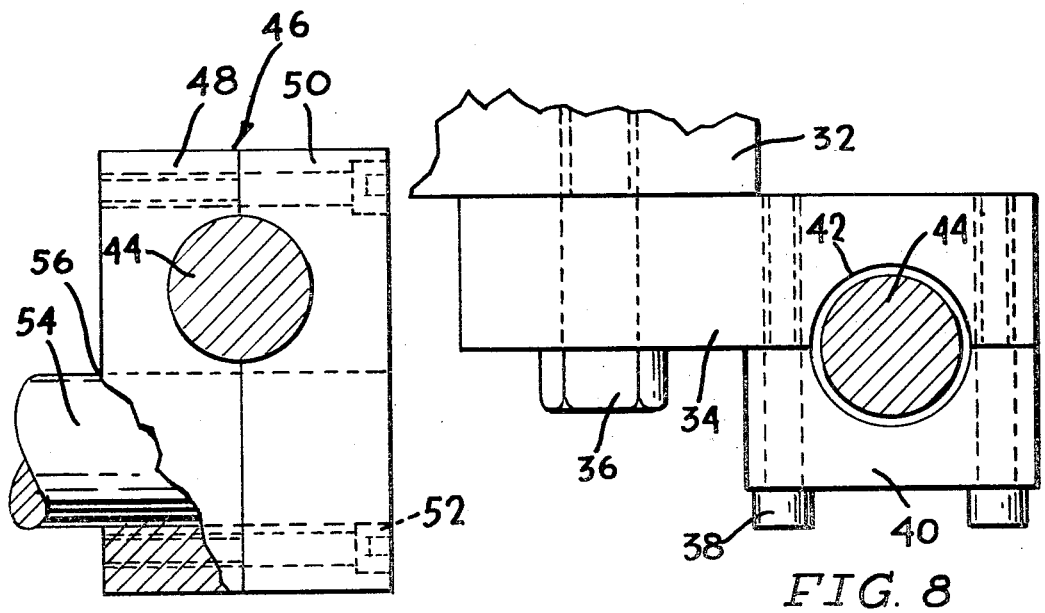

MOLD SEPARATING APPARATUS

BACKGROUND OF THE INVENTION

1. Field of the Invention

This invention relates generally to apparatus for molding plastic articles, and pertains more particularly to apparatus in which the mating or cooperable molding plates are automatically separated after the completion of a molding operation.

2. Description of the Prior Art

It is quite common to employ hydraulic presses utilizing three or more mold plates. Such a design involves at least one intermediate or floating plate that is urged against a fixed plate by the plate actuated or advanced by the main ram. When the plate carried by the ram is retracted, a sticking of the third (or more) plate is encountered with respect to the fixed plate. Consequently, various attempts have been made to solve the problem. Generally, the plates are still pulled from the press and pried apart.

One press involving an automatic separation of platens is disclosed in U.S. Pat. No. 1,800,849, granted Apr. 14, 1931 to Thomas F. Stacy titled "FLUID OPERATED PRESS." To the best of my knowledge, this type of press is not commercially offered. For one thing, it requires an auxiliary hydraulic system that contributes considerably to the cost of manufacturing the press. Additionally, the foregoing type of press does not provide a ready and practical means for adapting to transfer molding.

SUMMARY OF THE INVENTION

One object of the present invention is to provide apparatus for separating the mold plates of a multi-plate press. Stated somewhat differently, the present invention utilizes the existing power of the press.

Another object of the invention is to provide mold separating apparatus that enables multiple plate molds to be operated in an integrated manner with the press and with a minimum amount of human physical effort and time. Also, it is within the purview of the invention to provide mold separating apparatus that can be economically added to existing presses, yet which lends itself readily to inexpensive incorporation into presses during manufacture.

A further object of the invention is to provide apparatus of the foregoing character that affords an adjustable, simple adaptation to a variety of molds. It is, therefore, within the contemplation of the invention to permit its use on all sizes of molding equipment.

Yet another object is to provide separating apparatus that will function equally well in both vertical and horizontal presses, an injection press being an example of the latter.

A further object of the invention is to provide mold separating apparatus that does not appreciably increase the cost of a given press.

Still further, an object of the invention is to provide separating apparatus that does not entail any added maintenance as far as the press equipment is concerned.

Briefly, my invention envisages the incorporation of stop means that will be shifted on the advancing stroke of the main ram once the plate carried by the main ram engages the intermediate or floating plate (or plates) in the actuation of such intermediate plate (or plates) into an operative relationship with a fixed plate. On the return stroke, the stop means is engaged so as to forcibly separate the intermediate plate from the fixed plate. For instance, in transfer molding, the fixed plate functions as a plunger and enters a pot formed in the sprue plate to force the heated molding compound through the sprue or sprues into the mold cavity. The plunger constituting the fixed plate, owing to the remaining plastic material or cull, sticks to the sprue plate and this has caused problems throughout the years which have not up to this time been satisfactorily overcome. The present invention, however, pulls these plates apart, utilizing the power of the main ram in so doing and is particularly suited to presses having push back or pull back cylinders.

BRIEF DESCRIPTION OF THE DRAWINGS

FIG. 5 is a fragmentary sectional view showing the intermediate or floating plate arrangement that would typically be used in FIGS. 1-4, the view being on a larger scale and including details of a more specific nature than set forth in FIGS. 1-4;

FIG. 6 is a sectional detail taken in the direction of line 6—6 of FIG. 1;

FIG. 7 is a sectional detail taken in the direction of line 7—7 of FIG. 1; and

FIG. 8 is a sectional detail taken in the direction of line 8—8 of FIG. 1.

DESCRIPTION OF THE PREFERRED EMBODIMENT

Figure 1:
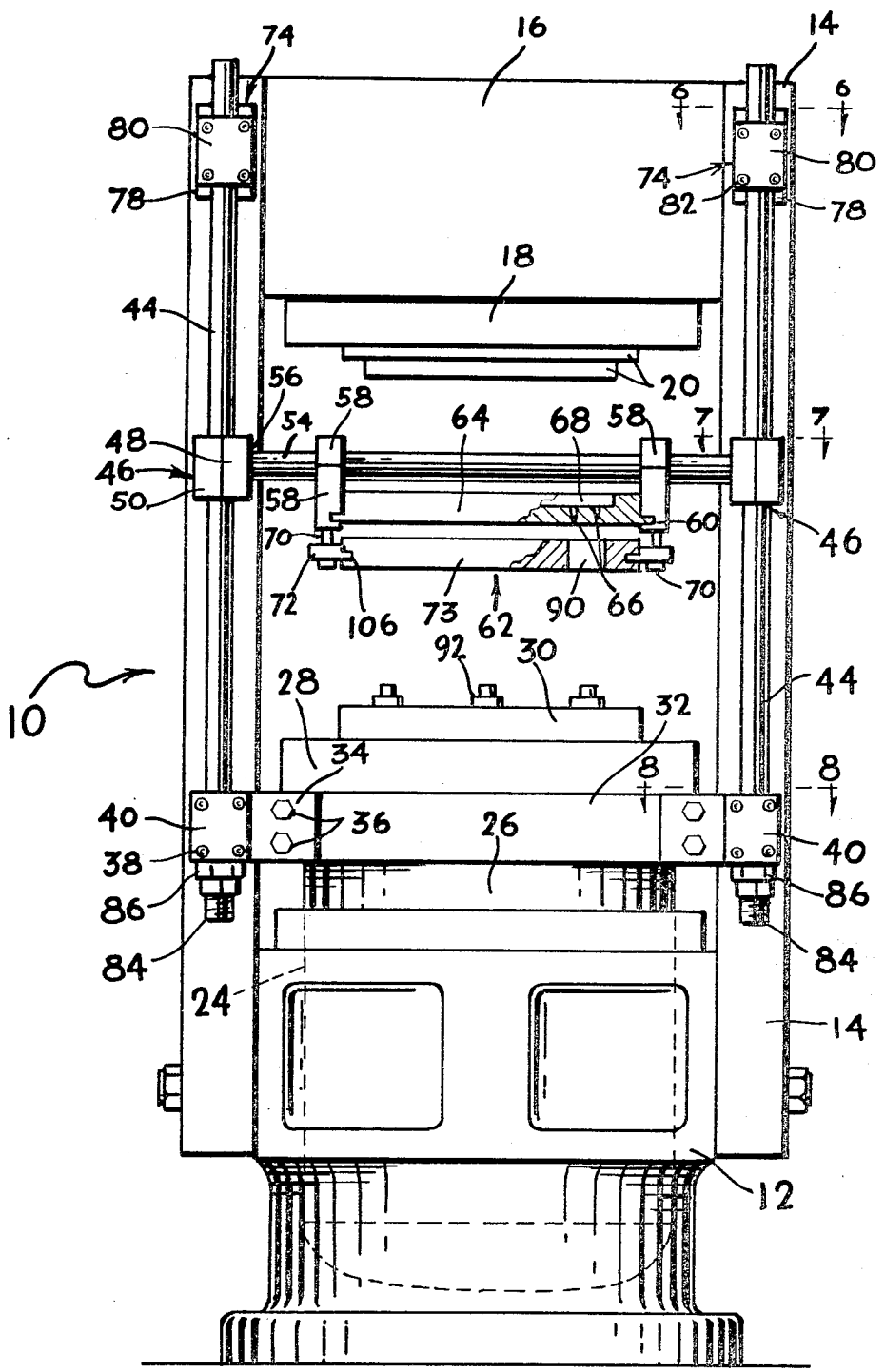
FIG. 1 is a front elevational view illustrating the press in an open position with the mold plates separated, this being the condition before the upward stroke of the main ram is initiated.
Figure 2:
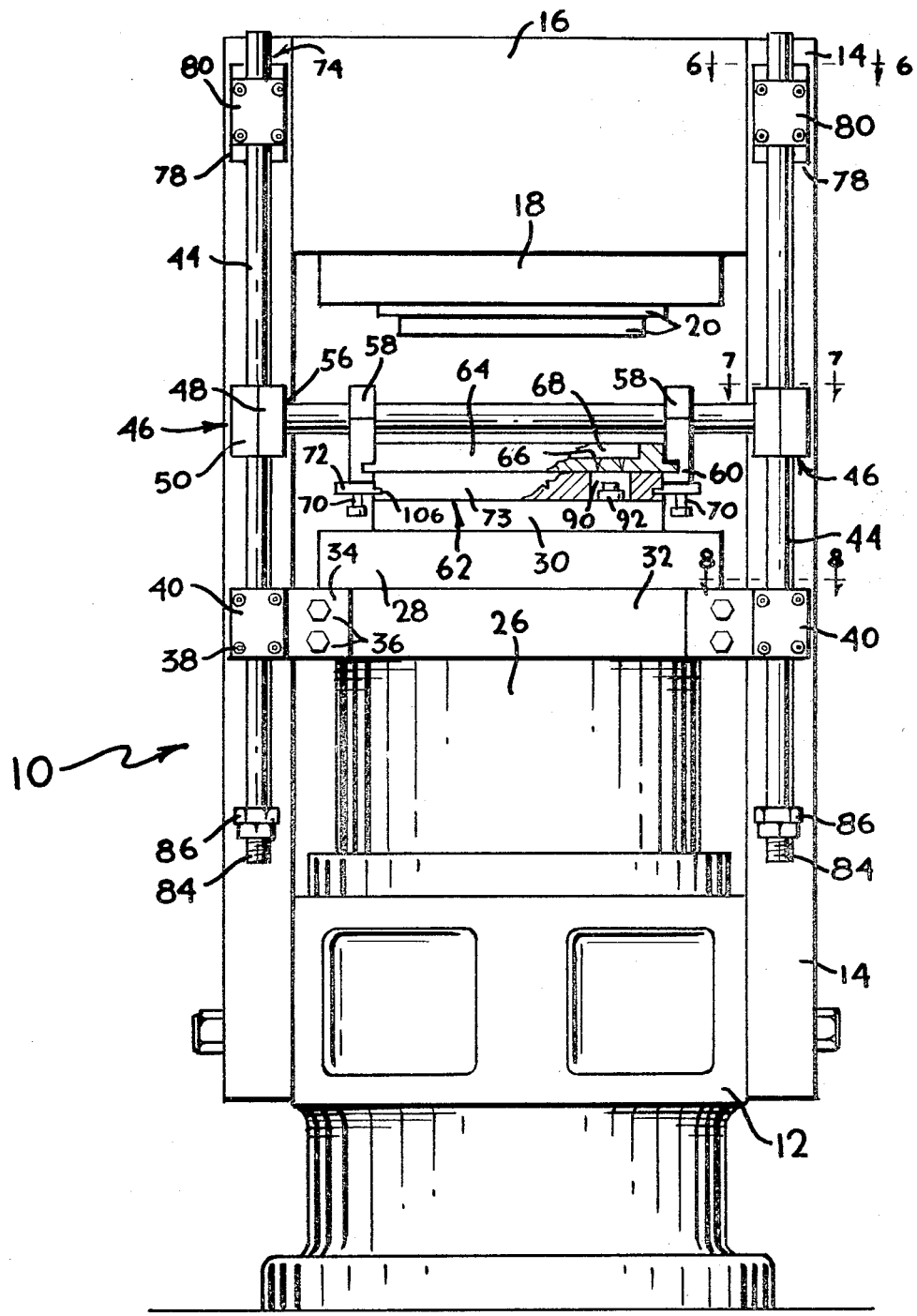
FIG. 2 corresponds to FIG. 1 but illustrates the main press ram after it has moved upwardly so as to engage the suspended intermediate mold plate.
Figure 3:
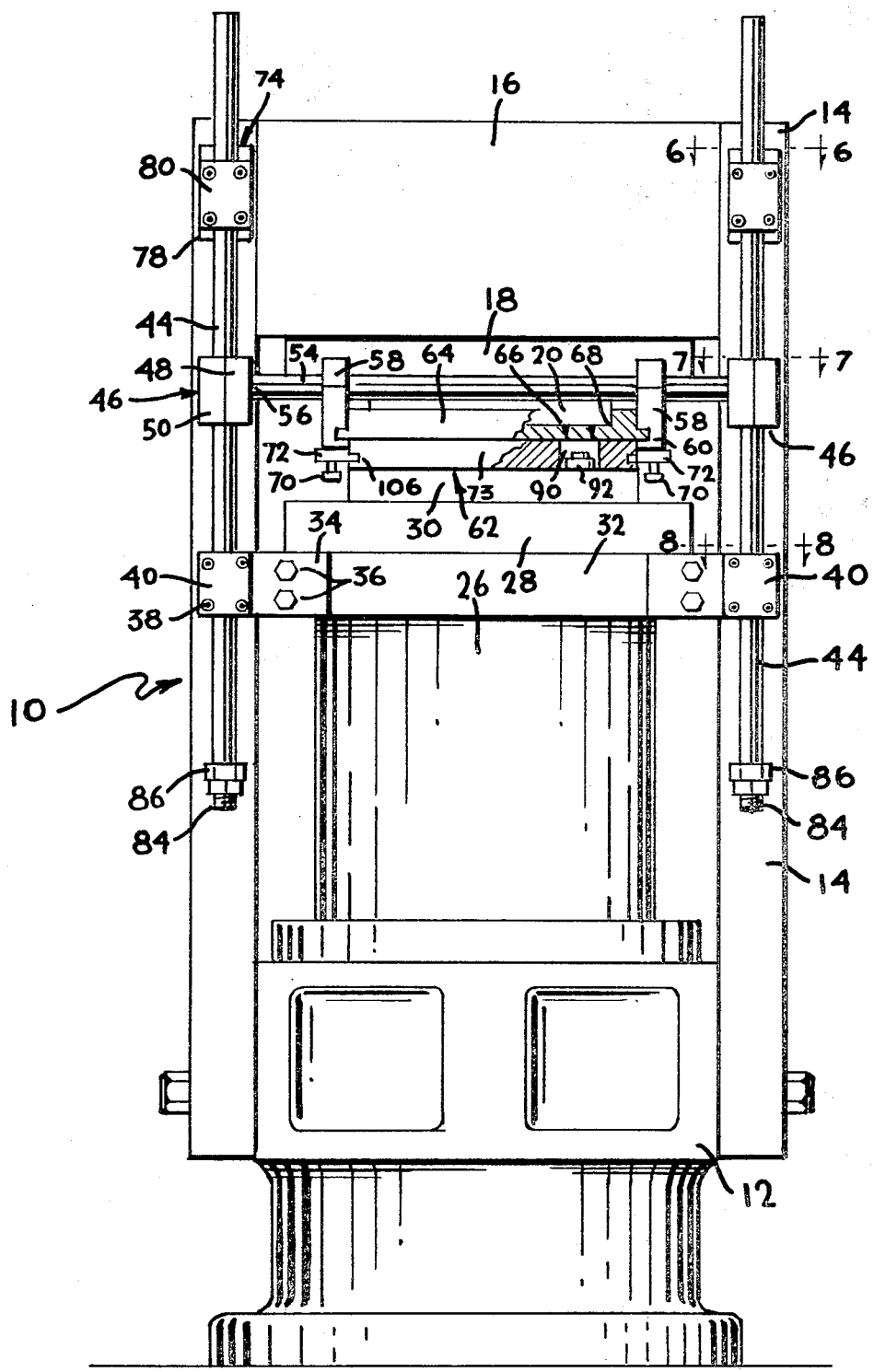
FIG. 3 illustrates the press of FIG. 1 after the ram has completed its upward or advancing stroke, this being the position in which the molding material is forced through the sprues into the various cavities.
Figure 4:
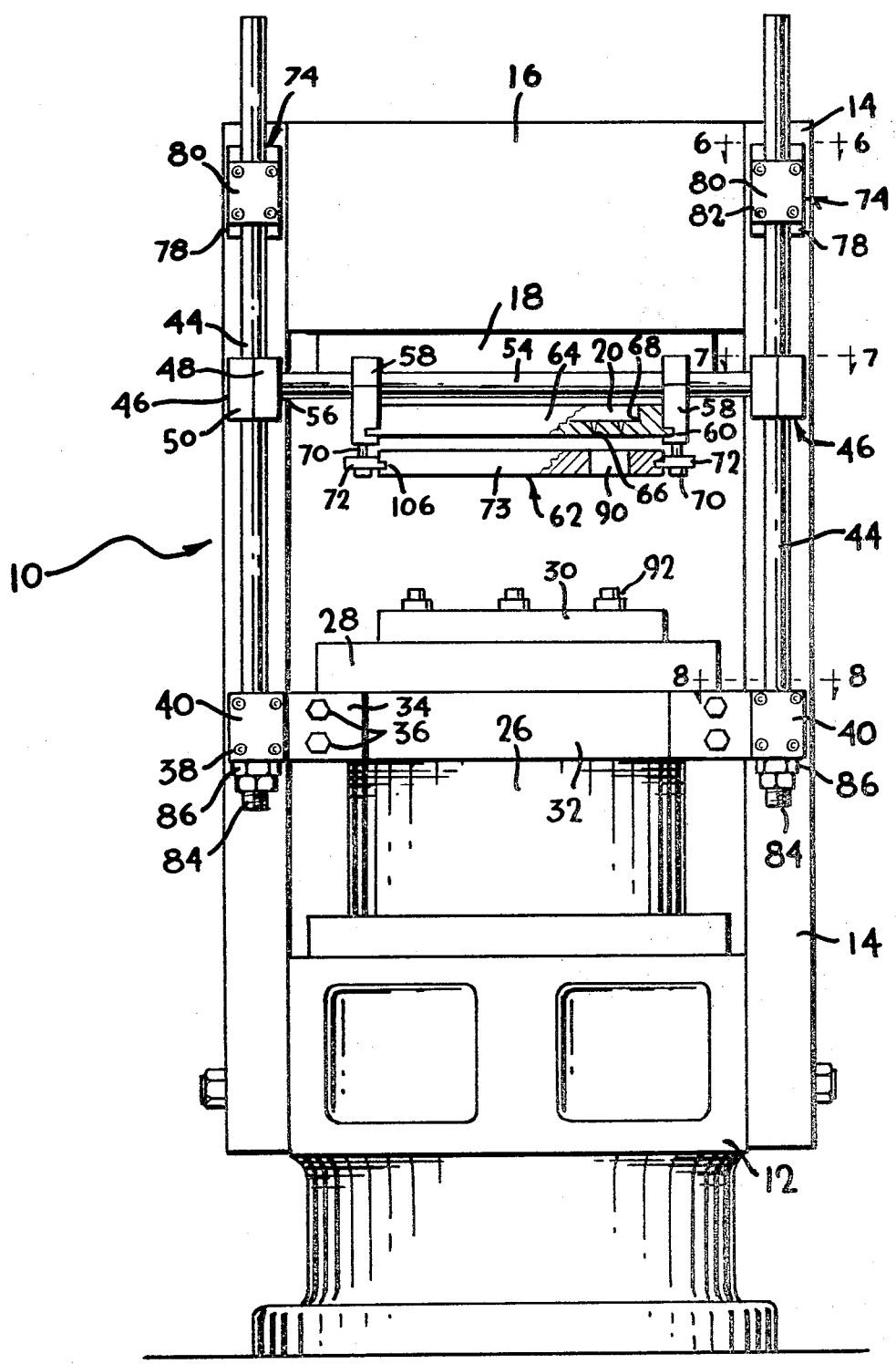
FIG. 4 depicts the press as the main ram is being retracted and illustrating the shuttle bars just as they are acted upon to cause separation of the intermediate plate from the uppermost plate.

In FIGS 1-4, a hydraulic press equipped with my mold separating apparatus has been denoted generally by the reference numeral 10. The press 10 comprises a base 12 having two upwardly extending side plates 14 and a head 16 fixedly carried at the upper ends of the side plates 14. Beneath the head 16 is a fixed platen 18 that supports an upper mold plate 20 that functions as a plunger when the invention is practiced in association with transfer molding techniques. However, the invention, it will be appreciated, is not restricted to transfer molding but can be used for injection molding as well. By the same token, the invention is not restricted to vertical presses and can be used in conjunction with horizontally oriented presses, particularly those employed in injection molding.

At any rate, the lower portion of the press 10 or the press body has been given the reference numeral 22 and houses the cylinder 24 for the main press ram 26. A platen 28 is attached to the ram 26 and supports a lower mold plate 30. By means of a bolster 32 a number of blocks 34, actually four such blocks, are moved upwardly when the lower mold plate 30 is advanced and moved downwardly when the lower mold plate 30 is retracted. The blocks 34 in each instance include mounting bolts 36 by which they are attached to the bolster 32 and also have auxiliary bolts 38 for attaching a mating cap 40. Clearance holes 42 through each block 34 are thus provided for shuttle rods 44.

The shuttle bars 44 play an important role in the practicing of my invention. In this regard, it will be noted that an equal number of clamps 46 formed with a machined block 48 and a mating block 50 grip central or mid-way portions of the shuttle bars 44, the blocks 48 and 50 being held together by bolts 52. It should be recognized, though, that the clamps 46 are fixedly attached to the shuttle bars 44. As the description continues, it will become clear that the function of the shuttle bars 44 is to support the mold plate suspension and to provide the means for the ram 26 to actuate the mold plates into an open or separated relationship. While the cross section of the bars 44 is illustrated as being circular, it will be seen that they can possess a rectangular cross sectional shape as well.

At this time attention is directed to a pair of tie bars 54 that have their opposite ends attached or anchored to the various clamps 46. The purpose of the tie bars 54, which are attached to the clamps 46 at 56, is to support a pair of framing bars 58 having grooves or notches 60 therein. Owing to their direct support on the tie bars 54, the framing bars 58 provide a direct mechanical linkage between the mold plate and the separating apparatus. These particular bars 58 extend through the press 10 from front to back and are adjustable in a conventional manner for various sizes of molds.

What will be termed a floating or intermediate plate assembly 62 (which could be a single plate) is actually a sprue plate 64 having any preferred number of sprue holes 66 therein and also being formed with a pot 68 in which the plastic compound or slug is placed, the plate 64 being framed in the grooves 60. It will be understood that the plate assembly designated generally by the reference numeral 62 may assume a variety of configurations. In the present instance, which is illustratively concerned with transfer molding, the plate 64 functions as the sprue plate and as already indicated provides the pot 68. It will be of some assistance, it is believed, to refer hereinafter to FIG. 5 that shows the plate assembly 62 corresponding to the plate assembly 62 in still further detail.

The suspended plate assembly 62 further includes shoulder bolts 70, the shanks of which pass through holes in auxiliary bars labeled 72. The lower cavity plate, identified by the numeral 73, really is a fourth plate but constitutes part of the plate assembly 62 inasmuch as it is suspended from the framing bars 58 as is the sprue plate 64. Once again, this plate construction is conventional as far as transfer molding is concerned.

Four brake devices 74 are fixedly attached to the side plates 14. One of the devices 74 is pictured to better advantage in FIG. 6 and it will be discerned that it includes a pair of split bushings 76, each formed with a groove which confronts the particular shuttle bar 44 with which it is associated. There is a flanged backup block 78, this being the block that is actually affixed to the side plates 14 and a front face block 80. By means of a plurality of take-up bolts 82, it will be seen that the amount of frictional drag imposed upon the shuttle bars 44 can be adjusted.

The shuttle bars 44 are threaded at their lower ends 84 and in this way a stop nut or collar 86 can be attached thereto. The function or purpose of the elements 86 will presently become manifest.

Although it is perhaps not essential that a detailed description of conventional transfer molding be given, nonetheless it is thought that such a description will make certain that the benefits to be derived from a practicing of my invention will be more fully appreciated. Therefore, resort should now be made to FIG. 5 where parts appearing in FIGS 1-4 bear the same reference numerals. Beneath the sprue plate 64 is the cavity plate 73 within which mold cavity 90 appears. Within the cavity 90 is a mold core pin 92 anchored into bottom plate 30, a portion thereof being set forth in FIG. 5. Formed in the cavity plate 73 are recesses or pockets 96 that contain breaker springs 98 that act against the plate 64.

Still further, FIG. 5 shows the floating bar 72, there actually being two such bars, provided with a pair of holes at 102, one such hole 102 permit the shanks of the shoulder bolts 70 to extend upwardly therethrough and the upper ends of the shoulder bolts 70 are threadedly received in holes 104 tapped in the framing bars 58. Each floating bar 72 is formed with a groove at 106 which receives thereon the grooved edge of the plate 73. By means of die springs 108 the floating bars 72 are urged downwardly and the springs 108 assist the earliermentioned springs 98 in effecting a breaking away of the plate 73 from the sprue plate 64.

As already indicated, though, the details given immediately above which are set forth in FIG. 5 are not critical in the practicing of the present invention. However, largely for the sake of completeness, such details have been pictorially presented.

OPERATION

Having presented the foregoing description, the manner in which my mold separating apparatus operates should be readily understood. However, a brief explanation certainly will facilitate a full appreciation thereof. Accordingly, when the main ram 26 begins its upward travel or stroke as illustrated in FIG. 1, the lower blocks 34 slide along the shuttle bars 44. Owing to the freedom of movement, there is no upward advancement of the shuttle bars 44 at this time.

However, when the lower mold plate 30 strikes the suspended plate assembly 62, more specifically the plate 73 is urged upwardly against the plate 64, being free to do so by reason of the shoulder bolts 70. When the plate 73 confronts the plate 64, then the plate assembly 62 moves upwardly in unison with the advancing lower plate 30.

Continued advancement of the ram 26 forces both the plates 30 and the suspension assembly 62 upwardly so that the assembly 62, more specifically the sprue plate 64 thereof, abuts the top most mold plate 20 that is fixedly attached to the platen 18 which in turn is fixedly carried immediately beneath the head 16.

It is during the combined upward movement of the plate 30 and the plate assembly 62, composed of the plates 64 and 73 as already described, that causes the shuttle bars 44 to be moved upwardly in unison with the continued advancement of the main ram 26. It will be recalled that the clamps 46 are fixedly anchored to the shuttle bars 44 so the upward movement of the plate assembly 62 causes a corresponding upward movement of the shuttle bars 44.

It is at the upper end of the advancement stroke of the ram 26 that the press 10 is in readiness for the actualy molding operation. Assuming that a slug of plastic material has been placed in the pot 68, the upper mold plate 20 functions as a plunger to force the plastic material down through the various sprue holes 66 into the cavity 90 as better seen from FIG. 5. It is at the completion of the curing portion of the molding cycle that the material remaining in the pot 68 and also in the sprue holes 66 provide a sticking action that resists separation of the plate assembly 62 from the uppermost plate or plunger. Sticking has proved especially troublesome, it might be pointed out, where rubber constitutes the plastic compound.

As the ram 26 moves downwardly, it will be recognized that initially the sticking of the plate 64 to the plate 20 is not overcome. However, continued downward movement or retraction of the ram 26, together with the lower mold plate 30, causes the lower blocks 34 to abut the stop elements 86 with the consequence that the shuttle bars 44 are pulled downwardly from this point on. Thus, the sprue plate 64 is separated from the plate 20 and the springs 98 and 108 then perform their breaking-away function as far as the plate 73 is concerned. However, the supplemental breaking action of the springs is not important to a full appreciation of the benefits to be gained from a practicing of my invention, as any tendency to stick in this region is insignificant, practically speaking.

FIG. 1, which represents the condition of the press 10 at the very beginning, also represents the condition of the press at the completion of the cycle which includes the full advancement and retraction of the lower plate 30 by means of the ram 26. It will be recognized that the brake devices 74 impose a frictional drag on the shuttle bars 44, doing so in both directions of movement of these bars 44. Hence, when the separation takes place, the restriction of free movement of the shuttle bars 44 results in the suspension of the plate assembly 62 in the position in which it is depicted in FIG. 1. Thus, the press is in readiness for a second or succeeding molding operation.

It will be appreciated that the mold plate 20 and the plates 64, 73 of the assembly 62 do not have to be removed or pulled out of the press in order to effect their separation, which has usually been by prying them apart. This is a tremendous saving as far as the operator's time is concerned and also renders his job appreciably less tedious. Still further, the heat remaining in the various plates is available for the molding operation, whereas if they are pulled from the press 10 more reheating thereof is necessary in order to render the plastic material sufficiently molten so that it can be formed into the articles of the configuration provided by the mold cavity 90 in association with whatever mold core pins 92 that are present in order to give the requisite design to the molded item. Frequently, a completely different set of plates is used in the next cycle for press efficiency reasons, and then by the time the set is again used it has cooled to even a greater degree.

I claim:

1. Mold apparatus comprising a first mold plate, first means for supporting said first mold plate, a second mold plate, second means for advancing and retracting said second mold plate toward and away from said first plate, a third mold plate, third means for movably mounting said third mold plate between said first and second means so that said second plate engages said third plate after sufficient advancement of said second plate has occurred whereby further advancement of said second plate causes said third plate to be moved toward said first plate, means engageable by said second means during the retraction thereof for separating said third plate from said first plate after completion of a molding operation, said separating means including an elongated member fixedly attached to said third means so as to be movable in unison therewith and a stop member near one end of said elongated member, said second means engaging said stop member during its retraction to cause separation of said third plate from said first plate, and brake means cooperable with said elongated member for imposing a frictional drag thereon.

2. Mold apparatus in accordance with claim 1 in which said brake means engages said elongated member near one end thereof to impart said frictional drag, and said second means includes a block member slidably engaging said elongated member near the other end thereof so as to permit said second means to move freely therealong when said second means is advanced and to abut said stop member during retraction of said second means.

* * * * *

UNITED STATES PATENT OFFICE
CERTIFICATE OF CORRECTION

Patent No. 3,685,939      Dated August 22, 1972

Inventor(s) Thomas A. Weir

It is certified that error appears in the above-identified patent and that said Letters Patent are hereby corrected as shown below:

Column 4, line 27, after "102" (second occurrence) insert --appearing in phantom outline in Figure 5. The holes 102--.

Signed and sealed this 23rd day of January 1973.

(SEAL)
Attest:

EDWARD M. FLETCHER, JR.
Attesting Officer

ROBERT GOTTSCHALK
Commissioner of Patents